United States Patent
Halbherr et al.

(10) Patent No.: US 10,118,353 B2
(45) Date of Patent: Nov. 6, 2018

(54) MOLDING CONTAINERS

(75) Inventors: Axel Halbherr, Ludwigshafen (DE);
Andreas Geiger, Steffisburg (CH);
Jurgen Pellenz, Zell/Mosel (DE)

(73) Assignee: RECKITT BENCKISER FINISH B.V., Hoofddorp (NL)

( * ) Notice: Subject to any disclaimer, the term of this patent is extended or adjusted under 35 U.S.C. 154(b) by 777 days.

(21) Appl. No.: 14/110,903

(22) PCT Filed: Apr. 5, 2012

(86) PCT No.: PCT/GB2012/050768
§ 371 (c)(1),
(2), (4) Date: Apr. 14, 2014

(87) PCT Pub. No.: WO2012/140412
PCT Pub. Date: Oct. 18, 2012

(65) Prior Publication Data
US 2014/0305074 A1    Oct. 16, 2014

(30) Foreign Application Priority Data

Apr. 11, 2011 (GB) .................................. 1106072

(51) Int. Cl.
*B29C 45/00* (2006.01)
*B29C 45/04* (2006.01)
(Continued)

(52) U.S. Cl.
CPC ........ *B29D 22/003* (2013.01); *B29C 45/2624* (2013.01); *B65B 3/022* (2013.01);
(Continued)

(58) Field of Classification Search
CPC ..... C11D 17/045; B29C 45/33; B29C 45/338; B29C 45/561
(Continued)

(56) References Cited

U.S. PATENT DOCUMENTS 3,564,660 A * 2/1971 Darnell ............... B29C 45/2624
425/192 R
3,585,690 A * 6/1971 Tucker ................ B29C 45/2624
425/139
(Continued)

FOREIGN PATENT DOCUMENTS

EP       2617659 A1 *  7/2013  ............. B65D 65/46
GB       2376676 A     12/2002
(Continued)

OTHER PUBLICATIONS

English language translation of paper by: Logechcj, J.P., "Thermoplast Injection Molding," 2010, pp. 84, 85, and 97, St. Petersburg, Russia.
(Continued)

*Primary Examiner* — Andrew M Tecco
*Assistant Examiner* — Eyamindae Jallow
(74) *Attorney, Agent, or Firm* — Troutman Sanders LLP; Ryan Schneider; Chris Davis

(57) ABSTRACT

A method of making an upwardly open container having a base wall, an upright perimeter wall, and an upright internal wall between one part of the perimeter wall and another part of the perimeter wall, the perimeter wall and the internal wall forming first and second compartments within the container, wherein the method comprises injecting a molten water-soluble polymer into a mold cavity between cooperating male and female mold parts; wherein there are independently movable first and second male parts separated by a gap in which the internal wall is formed, and wherein the first and second male parts correspond to the first and second compartments of the container to be formed.

12 Claims, 4 Drawing Sheets

(51) Int. Cl.
*B29C 45/08* (2006.01)
*B29D 22/00* (2006.01)
*B29C 45/26* (2006.01)
*B65B 3/02* (2006.01)
*B65B 29/10* (2006.01)
*B29L 31/00* (2006.01)

(52) U.S. Cl.
CPC ...... *B65B 29/10* (2013.01); *B29K 2995/0062* (2013.01); *B29L 2031/712* (2013.01)

(58) Field of Classification Search
USPC ....... 53/122, 452, 473, 474, 558; 264/328.1, 264/328.7
See application file for complete search history.

(56) References Cited

U.S. PATENT DOCUMENTS

| | | | | |
|---|---|---|---|---|
| 3,673,302 | A | | 6/1972 | Halsall et al. |
| 3,838,960 | A | * | 10/1974 | Lovejoy ............... B29C 45/33 249/105 |
| 3,871,611 | A | * | 3/1975 | Taketa ................. B29C 33/306 249/102 |
| 3,930,780 | A | | 1/1976 | Lovejoy |
| 4,998,874 | A | * | 3/1991 | Stocchiero ............ B29C 45/40 249/176 |
| 5,149,479 | A | * | 9/1992 | Nakajima ........... B29C 37/0057 264/163 |
| 2002/0109268 | A1 | * | 8/2002 | McLaren ................ B29C 33/60 264/331.19 |
| 2008/0314911 | A1 | * | 12/2008 | Duffield .............. A47L 15/4445 220/604 |
| 2010/0308505 | A1 | * | 12/2010 | Welch .................... B29C 33/38 264/337 |
| 2012/0312735 | A1 | * | 12/2012 | Wood .................... B29C 45/14 210/493.1 |

FOREIGN PATENT DOCUMENTS

| | | |
|---|---|---|
| JP | 5154876 A | 6/1993 |
| WO | 0136290 A1 | 5/2001 |
| WO | 2005058700 A1 | 6/2005 |
| WO | 2007057653 A1 | 5/2007 |

OTHER PUBLICATIONS

International Search Report dated Jun. 19, 2012 for priority application PCT/GB2012/050768.
Examination Report under Section 18(3) Application No. GB1318018.7 dated Mar. 24, 2016; 3 pages.
Brooks, D., et al., "PET Packaging Technology," 2006, Professiya Publishing House, for co-pending Russian Application No. RU20130150098, filed Apr. 5, 2012, Russian w/English Translation, 8 pages.

* cited by examiner

MOLDING CONTAINERS

CROSS-REFERENCE TO RELATED APPLICATIONS

This application is a US National Stage of International Application No. PCT/GB2012/050768, filed 5 Apr. 2012, which claims the benefit of GB 1106072.0, filed 11 Apr. 2011, both herein fully incorporated by reference.

This invention relates to a method of making a container, and to a container per se.

The invention relates in particular to containers made from a water-soluble polymer. The containers can be filled with washing compositions, sealed to form an enclosure, and used as a unit-dose article in a ware-washing method, for example in a laundry washing machine or a dishwashing machine.

There are many forms of unit-dose articles used to deliver a cleaning composition to a ware-washing machine, in which a cleaning composition—whether in a tablet, particulate, gel or liquid form—is enclosed in a water-soluble polymer. As well as providing consistent dosing such articles are easy to handle and often are of attractive appearance.

One type of unit-dose article has a moulded container, which, when filled with cleaning composition, is closed by a lidding film. The article may be cuboid in overall shape, having a base wall and, extending upwards from the base wall, a perimeter wall. There may be an upright internal wall extending between respective parts of the perimeter wall, dividing the container into compartments. The internal wall may, further, define an additional recess. Such an article may thus have three compartments, to receive different cleaning compositions, and by a selection of internal wall shapes and composition colours the overall aesthetic effect can be pleasing.

Such a known unit-dose container, when unfilled and unlidded, resembles that shown in FIG. 1.

Such a unit-does container is made by injection moulding. The perimeter wall and the internal wall are orthogonal to the base wall, and so facilitate the moulding process.

The moulding process for such a unit-dose container involves one male part and one female part. The process is successful, but with this method there is a limit to the thinness of the walls (especially internal walls) that can be produced. Moreover it is difficult to give the mould surfaces which define the internal wall a desirably smooth finish, which would lead to improved containers, and/or to a more reliable production method for containers. It would also be desirable to reduce the time for the moulding cycle.

Such products and methods are further described in WO 01/36290 A1.

Our earlier patent application WO 2007/057653 A1 describes one attempt to improve the manufacture of water-soluble containers, by using the technique of injection compression moulding, in which there is relative movement between the male part and the female part to reduce the volume of the mould cavity when the molten water-soluble polymer is injected into the mould, so as to force the polymer to fill the available spaces rapidly and completely. However although this technique could give benefit in terms of moulding cycle time and reduced wall thickness, there are considerable engineering issues and capital costs associated with its implementation.

An alternative process which can give benefit but which can be implemented more readily, is still required.

In accordance with a first aspect of the present invention there is provided a method of making an upwardly open container having a base wall, an upright perimeter wall, and an upright internal wall between one part of the perimeter wall and another part of the perimeter wall, the internal wall and the perimeter wall forming first and second compartments within the container, wherein the method comprises injecting a molten water-soluble polymer into a mould cavity between cooperating male and female mould parts; wherein there are independently movable first and second male parts separated by a gap in which the internal wall is formed, and wherein the first and second male parts correspond to the first and second compartments of the container to be formed.

By using plural male mould parts substantial benefits may be achieved. The internal wall is better supported during the process of mould opening and container removal. Also, the respective surfaces of the mould parts which define the space in which the internal wall is formed, are fully accessible, so that they can be given an optimal, smooth, surface finish, which aids release of the moulded container, and minimises the risk of residues, on these surfaces. For these reasons the internal wall may be made thinner than has hitherto been possible. The external walls may also be thinner than they have been hitherto. If wished they could have the same thickness as the internal wall; though different thicknesses for the perimeter walls and the internal wall could be selected in some embodiments. We have also found that the mould cycle time can be reduced. The use of thinner walls means that less water-soluble polymer is used. This has an immediate economic benefit in terms of cost of goods. It also has a use benefit, in that the article may dissolve more quickly, than a prior article, with thicker walls.

Some characteristics of the container which can now be produced by the method of the first aspect are described in the following paragraphs.

The internal wall is preferably the same height as the perimeter wall. Preferably the top of the perimeter wall and the top of the internal wall lie in a common plane. Preferably they terminate in respective flanges, to which a lidding film may be reliably sealed.

Preferably the internal wall joins to the perimeter wall at two generally opposed places, so that it spans the container.

The internal wall may be a simple wall, for example a straight wall or a shaped (for example sinuous wall) between one part of the perimeter wall and another part of the perimeter wall.

Alternatively the internal wall may be a complex internal wall.

A complex internal wall could be a wall with one branch wall connected to another part of the perimeter wall, thereby forming three compartments each bounded in part by a section of the perimeter wall; or two or more branches each connected to other parts of the perimeter wall, forming four or more compartments each bounded in part by a section of the perimeter wall.

A complex internal wall could be a wall which itself has internal compartment, which is not bounded by the perimeter wall. That is, the internal compartment is an interruption or widening in the wall.

A complex internal wall having one or more branch walls and one or more internal compartments is not excluded.

However all such embodiments have in common that the container has an upright internal wall (whether of simple or complex form) between one part of the of the perimeter wall and another part of the perimeter wall, the internal wall and the perimeter wall forming N compartments within the container, and the moulding method uses N independently movable male parts which correspond to the N compartments; N being at least 2.

N is preferably 2 but could feasibly be 3, 4, 5, 6 or more, in certain embodiments.

N is preferably not greater than 8, preferably not greater than 6 or 5.

In one preferred embodiment the container has only two compartments N, each formed by a section of the perimeter wall, and by a simple internal wall.

In one preferred embodiment the container has first and second compartments which together form the perimeter wall, one internal compartment which is entirely spaced from the perimeter wall; and no further compartments beyond these three. The first and second compartments are each formed by a section of the perimeter wall, and by a complex internal wall, which has an interruption which forms the internal compartment. Thus N is 2 in this preferred embodiment but additionally has one internal compartment (that is, a compartment which is spaced from the perimeter wall).

In such an embodiment in which the container produced by the method has said first and second compartments with an internal compartment between them, said first and second male parts define the first and second compartments. The wall of the internal compartment is defined between the first and second mould parts, and an additional mould part located between them.

Preferably any internal wall is generally aligned with an upright wall of a male part. An alternative statement having the same practical effect is that each internal wall is defined between opposed upright surfaces of respective male parts.

Preferably the perimeter wall is generally aligned with an upright wall of a male part. An alternative statement having the same practical effect is that each internal wall is defined between the upright wall of a male mould, and the opposed upright wall of the female mould.

The base wall, perimeter wall and internal wall may differ in thickness, within one container, depending on the characteristics of the particular moulding process. This is conventional. However, using the method of the invention the mean thickness of the base wall, perimeter wall and internal wall is not greater than 0.6 mm, preferably not greater than 0.5 mm, and most preferably not greater than 0.4 mm. The mean thickness may be determined by the method given later.

Preferably the weight of the container (without the closure (lid) or the compositions with will contain) is not greater than 2.5 g, preferably not greater than 2.4 g, preferably not greater than 2.3 g, preferably not greater than 2.2 g, preferably not greater than 2.1 g, and more preferably not greater than 2.0 g.

Preferably the fill volume of the container (that is, the summated volumes of the compartments, is in the range 12-24 $cm^3$, preferably in the range 14-20 $cm^3$, preferably in the range 16-18 $cm^3$.

Preferably the first compartment has a fill volume of not less than 4 $cm^3$, preferably not less than 8 $cm^3$.

Preferably the second compartment has a fill volume of not less than 2 $cm^3$, preferably not less than 4 $cm^3$.

Preferably an internal compartment (when present), which is entirely spaced from the perimeter, of the container has a fill volume of not less than 1 $cm^3$, preferably not less than 2 $cm^3$.

Preferably the moulding process produces an array of conjoined containers, which are separated during manufacture, or which are separable by the user.

Preferably the moulding cycle (starting point—mould closure—polymer injection—polymer setting—mould opening—container(s) removal—stop position) is less than 10 seconds, preferably less than 8 seconds, preferably less than 7 seconds.

The perimeter wall could be endless—that is to say, with no corners e.g. circular or oval, in plan view. Preferably, however, it is made up of wall portions, with corners between them. Most preferably it is made up of four wall portions, such that the container is an upwardly open cuboid.

In accordance with a second aspect of the present invention there is provided a method of making the mould parts to carry out the method of the first aspect, comprising forming the first and second mould parts and the female mould part (e.g. by conventional methods) and smoothing all of the polymer-contacting surfaces of the first and second mould parts.

Preferably one or more of the polymer-contacting surfaces, in particular the internal wall of the container, but preferably also other polymer-contacting surfaces of the first and second mould parts, are smoothed to a high quality; preferably including the polymer-contacting surfaces which are to define the internal wall of the container. Heretofore is has not been possible to obtain a desirably high quality finish for the latter surfaces, which have been inaccessible, and it has not been possible to use the same method for such surfaces, as for other surfaces. According to the second aspect, the surfaces which are to define the internal wall of the container are suitably subjected to the same method of smoothing as other polymer-contacting surfaces of the first and second mould parts. Preferably the same surface finish quality is achieved, as for other polymer-contacting surfaces. Preferably smoothing, for example polishing, occurs by a mechanical to-and-fro action generally parallel to the demolding direction, so that resulting microscopic striations follow the demoulding direction.

Preferably the surfaces which are to define the internal wall of the container, and preferably other polymer-contacting surfaces of the first and second mould parts, achieve a polished finish.

In accordance with a third aspect of the present invention there is provided a method of making a unit-dose warewashing product, comprising making an upwardly open container by the method of the first aspect, introducing different compositions effective in cleaning into respective compartments, and closing the container.

Preferably a closure, for example a lidding film, also of water-soluble polymer, is used to close the container, by sealing across the top of the perimeter wall.

Definitions and statements of preferred and alternative embodiments stated above in relation to any of the five defined aspects, apply to all other aspects (unless an express statement or the context demands otherwise).

Suitable components of cleaning compositions used in the present invention are as follows.

Builders

The cleaning agents may comprise conventional amounts of detergent builders which may be either phosphorous based (e.g. STPP) or non-phosphorous based, or even a combination of both types. Suitable builders are well known in the art. Non-phosphorous builders are preferred.

Non-phosphorous based builder may be organic molecules with carboxylic group(s), amino acid based compound or a succinic acid or succinate based compound.

Builder compounds which are organic molecules containing carboxylic groups include citric acid, fumaric acid, tartaric acid, maleic acid, lactic acid and salts thereof. In particular the alkali or alkaline earth metal salts of these organic compounds may be used, and especially the sodium salts. An especially preferred builder is sodium citrate.

Preferred examples of amino acid based compounds according to the invention are MGDA (methyl-glycine-diacetic acid, and salts and derivatives thereof) and GLDA (glutamic-N,N-diacetic acid and salts and derivatives thereof). GLDA (salts and derivatives thereof) is especially preferred according to the invention, with the tetrasodium salt thereof being especially preferred.

Preferably the total amount of builder present in the cleaning agents of the invention is an amount of at least 5% wt, preferably at least 20% wt, more preferably at least 30% wt, and most preferably at least 40% wt.

Preferably the total amount of builder present in the cleaning agents of the invention is an amount of up to 80% wt, preferably up to 70% wt, preferably up to 60% wt, and most preferably up to 50% wt.

Surfactants

The cleaning agents of the invention may contain surfactants. Preferred surfactants are anionic surfactants and non-ionic surfactants. Many such surfactants are described in Kirk Othmer's Encyclopedia of Chemical Technology, 3rd Ed., Vol. 22, pp. 360-379, "Surfactants and Detersive Systems".

A preferred class of nonionic surfactants is alkoxylated non-ionic surfactants prepared by the reaction of a monohydroxy alkanol or alkylphenol having 6 to 20 carbon atoms, preferably 10 to 18 carbon atoms, most preferably 12 to 15 carbon atoms. Preferably the surfactants have at least 10 moles of ethylene oxide and/or propylene oxide, preferably at least 12 moles, per mole of alcohol or alkylphenol; most preferably 5-10 moles of ethylene oxide and 3-6 moles of propylene oxide, per mole of alcohol or alkylphenol.

Preferably the surfactant(s) is/are present in the cleaning agents used in the invention in an amount of from 0.1% wt, more preferably from 0.2% wt, most preferably from 0.5% wt.

Preferably the surfactant(s) is/are present in the cleaning agents used in the invention in an amount of up to 10% wt, preferably up to 5% wt, most preferably up to 3% wt.

Anti-Corrosion Agents

It is known to include a source of multivalent ions in cleaning agents, and in particular in automatic dishwashing compositions, for technical and/or performance reasons. For example, multivalent ions and especially zinc and/or manganese ions have been included for their ability to inhibit corrosion on metal and/or glass. Zinc sulphate is a preferred compound for this purpose.

Any conventional amount of multivalent ions/multivalent ions source may be included in the cleaning agents used in the invention. However, it is preferred that the multivalent ions are present in an amount of from 0.01% wt, preferably of from 0.05% wt, preferably of from 0.1% wt. It is preferred that the multivalent ions are present in an amount of up to 5% wt, preferably up to 3% wt, preferably up to 2.5% wt.

Performance Polymers

Polymers intended to improve the cleaning performance of the cleaning agents may also be included therein. For example sulphonated polymers may be used. Preferred examples include copolymers of $CH_2=CR^1-CR^2R^3-O-C_4H_3R^4-SO_3X$ wherein $R^1$, $R^2$, $R^3$, $R^4$ are independently 1 to 6 carbon alkyl or hydrogen, and X is hydrogen or alkali with any suitable other monomer units including modified acrylic, fumaric, maleic, itaconic, aconitic, mesaconic, citraconic and methylenemalonic acid or their salts, maleic anhydride, acrylamide, alkylene, vinylmethyl ether, styrene and any mixtures thereof. Other suitable sulfonated monomers for incorporation in sulfonated (co)polymers are 2-acrylamido-2-methyl-1-propanesulfonic acid, 2-methacrylamido-2-methyl-1-propanesulfonic acid, 3-methacrylamido-2-hydroxypropane-sulfonic acid, allysulfonic acid, methallysulfonic acid, 2-hydroxy-3-(2-propenyl-oxy)propanesulfonic acid, 2-methyl-2-propenen-1-sulfonic acid, styrenesulfonic acid, vinylsulfonic acid, 3-sulfopropyl acrylate, 3-sulfopropylmethacrylate, sulfomethylacrylamide, sulfomethylmethacrylamide and water soluble salts thereof.

When a sulfonated polymer is present, it is preferably present in the cleaning agents in an amount of at least 0.1% wt, more preferably at least 1% wt, preferably at least 2% wt, and most preferably at least 5% wt. A sulfonated polymer, when present, is preferably present in the cleaning agents in an amount of up to 30% wt, preferably up to 20% wt, most preferably up to 15% wt.

Enzymes

The cleaning agents of the invention may comprise one or more enzymes. It is preferred that the enzyme is selected from protease, lipase, amylase, cellulase and peroxidase enzymes.

Desirably enzyme(s) is/are present in the cleaning agents in an amount of from 0.01% wt, especially of from 0.1% wt, most preferably of from 0.2% wt. Desirably enzyme(s) is/are present in the cleaning agent in an amount of up to 10% wt, preferably up to 7% wt, most preferably up to 5% wt.

Bleaching Compounds

Any type of bleaching compound conventionally used in dishwashing compositions may be used according to the present invention. Preferably the bleaching compound is selected from inorganic peroxides or organic peracids, derivatives thereof (including their salts) and mixtures thereof. Especially preferred inorganic peroxides are percarbonates, perborates and persulphates with their sodium and potassium salts being most preferred. Sodium percarbonate and sodium perborate are most preferred, especially sodium percarbonate.

Organic peracids include all organic peracids traditionally used as bleaches, including, for example, perbenzoic acid and peroxycarboxylic acids such as mono- or diperoxyphthalic acid, 2-octyldiperoxysuccinic acid, diperoxydodecanedicarboxylic acid, diperoxy-azelaic acid and imidoperoxycarboxylic acid and, optionally, the salts thereof. Especially preferred is phthalimidoperhexanoic acid (PAP).

Bleaching compounds herein may include bleach activators and bleach catalysts.

When a bleaching compound is present in the cleaning agents of the invention it is suitably present in an amount of from 1% wt, preferably of from 2% wt, most preferably of from 5% wt; and preferably an amount up to 40% wt, preferably up to 30% wt, most preferably up to 20% wt.

A bleaching compound may be protected from another component which it may degrade, and/or which may cause its own degradation. For examples a bleaching compound and an enzyme may be protected from each other, by physical separation.

Other Components

The cleaning agents of the invention may also comprise minor, conventional amounts of thickeners, wetting agents, perfumes, preservatives and/or colourants. Such ingredients are typically present in amounts of up to 2% wt.

The cleaning agent may suitably comprise water. Suitably the water content is not more than 30% wt, preferably not more than 20% wt, preferably not more than 10% wt, preferably not more than 5% wt, of the cleaning agents.

All of the numerical definitions given above for amounts of a component of the cleaning agents represent the total amount of such components, when more than one is present e.g. the total enzyme content, when there are two types of enzyme, or two or more types of bleach compounds.

A water-soluble polymeric material for use in such embodiments may suitably be selected from the group comprising polyvinyl alcohols, polyvinyl alcohol copolymers, partially hydrolyzed polyvinyl acetates, cellulose derivatives (such as alkylcelluloses, hydroxyalkylcelluloses, salts, ethers and esters of alkylcelluloses and hydroxyalkylcelluloses, for example, hydroxypropylcellulose, hydroxypropylmethyl-cellulose and sodium carboxymethylcellulose); polyglycolides, polyglycolic acids, polylactides, polylactic acids; polyvinyl pyrrolidines, polyacrylic acids or salts or esters thereof, polymaleic acids or salts or esters thereof, dextrins, maltodextrins, polyacrylamides, acrylic acid/maleic anhydride copolymers, including copolymers (which includes terpolymers), and blends. Optionally fillers, plasticisers and process aids may also be comprised in the formulation of a water-soluble polymeric material for use herein.

Preferred polymeric materials are selected from the group comprising polyvinyl alcohols, polyvinyl alcohol copolymers, and partially hydrolyzed polyvinyl acetates. An especially preferred water-soluble polymeric material comprises a poly(vinyl alcohol).

The invention will now be further described, by way of example, with reference to the accompanying drawings, which show, all in perspective views.

Figure 2:
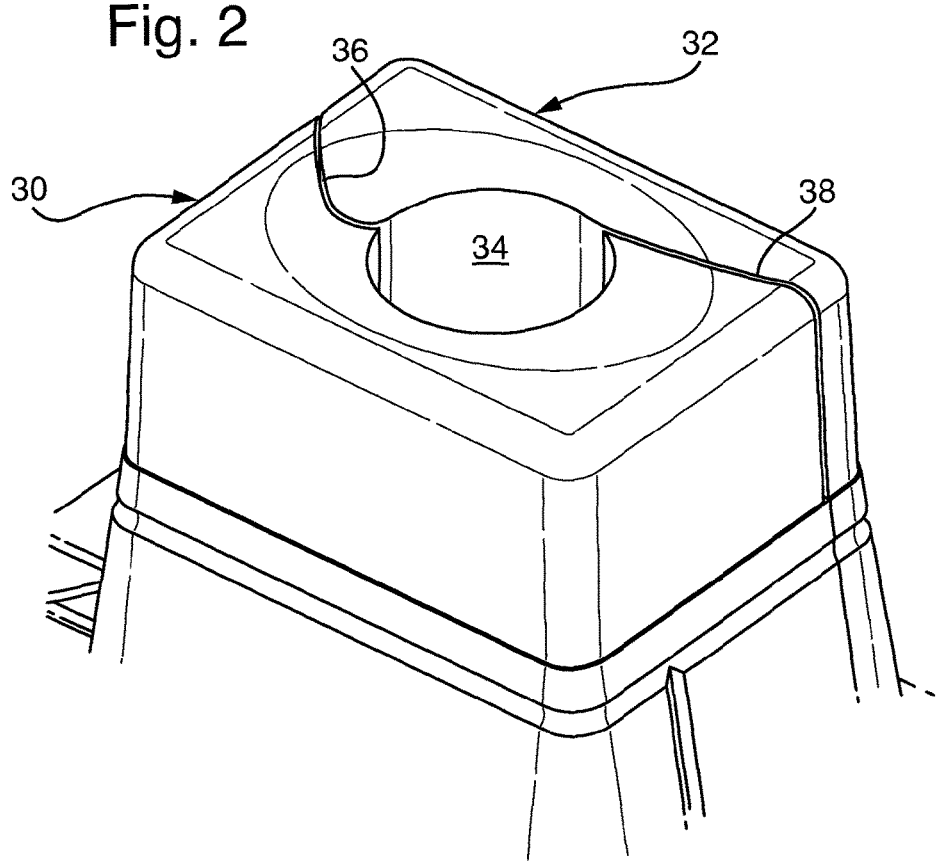
FIG. 2 shows the male mould parts used in the manufacture of the container shown in FIG. 1, in matched locations.
Figure 3:
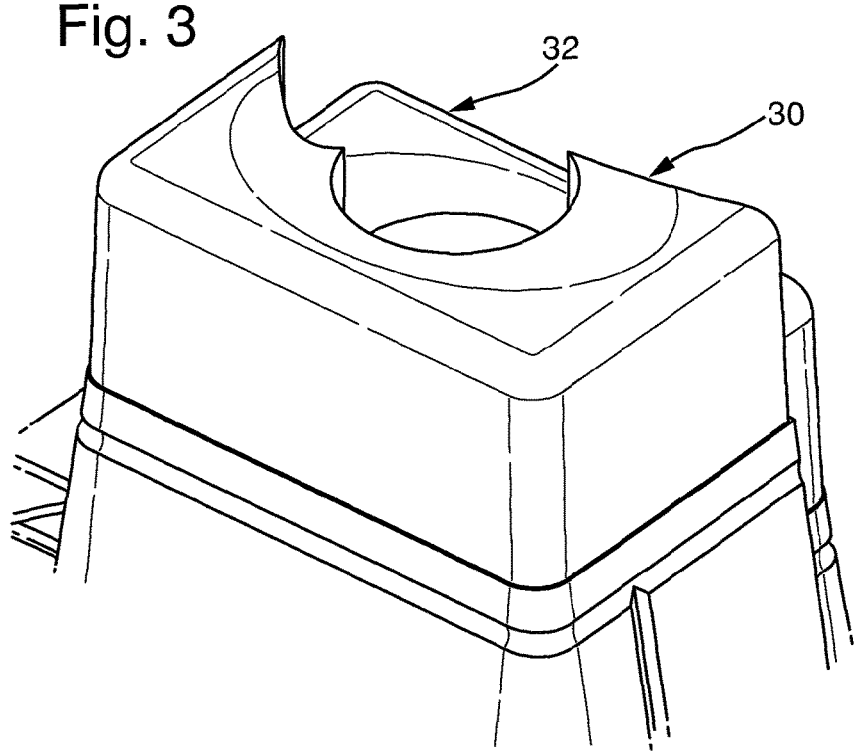
FIG. 3 is a view corresponding to that of FIG. 2, but shows the two mould parts in relative displaced locations.
Figure 4:
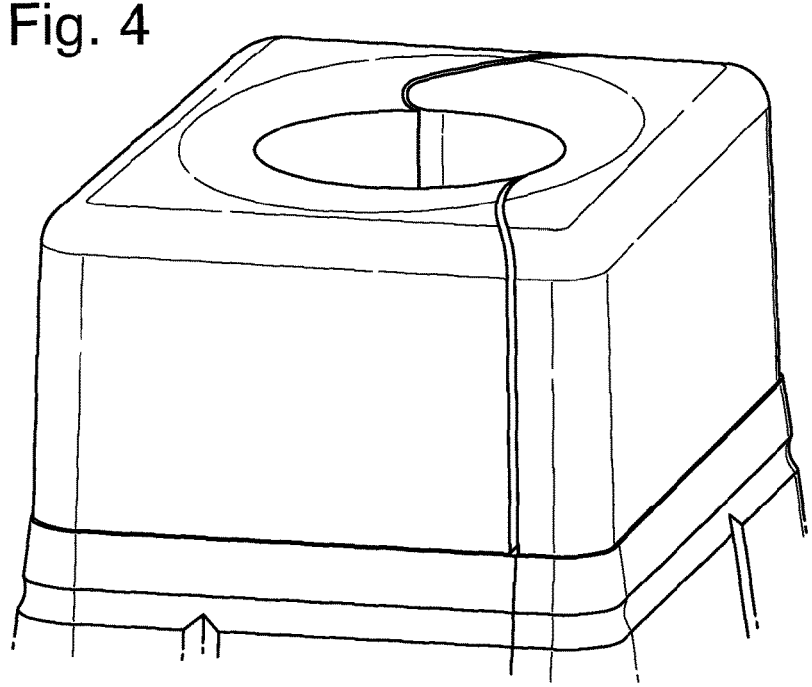
Figure 5:
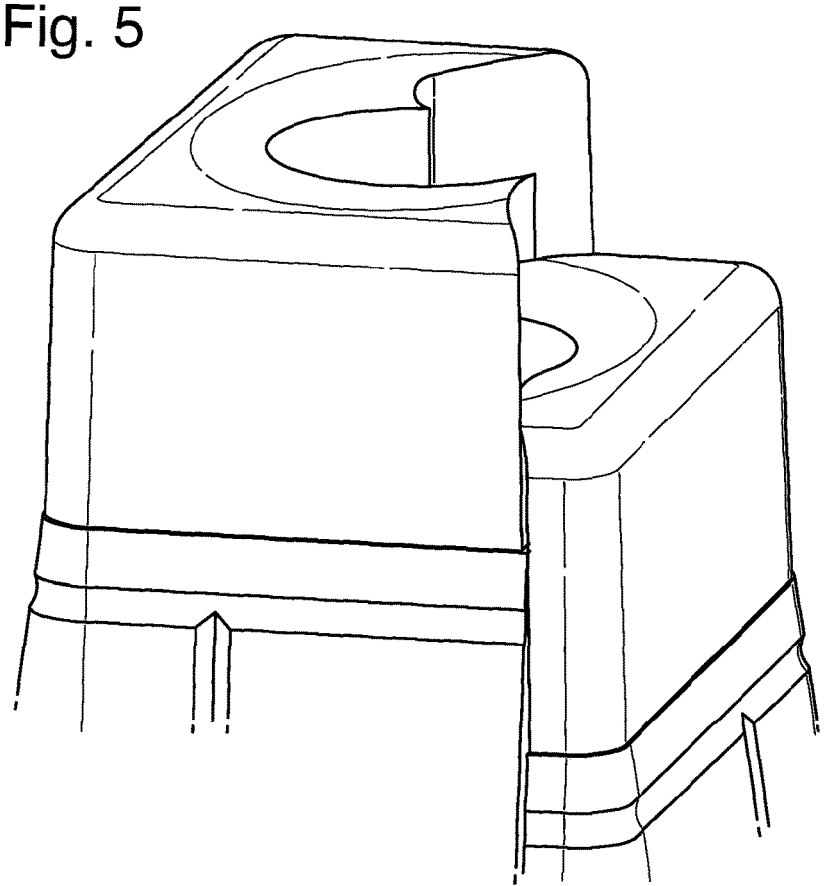
Figure 6:
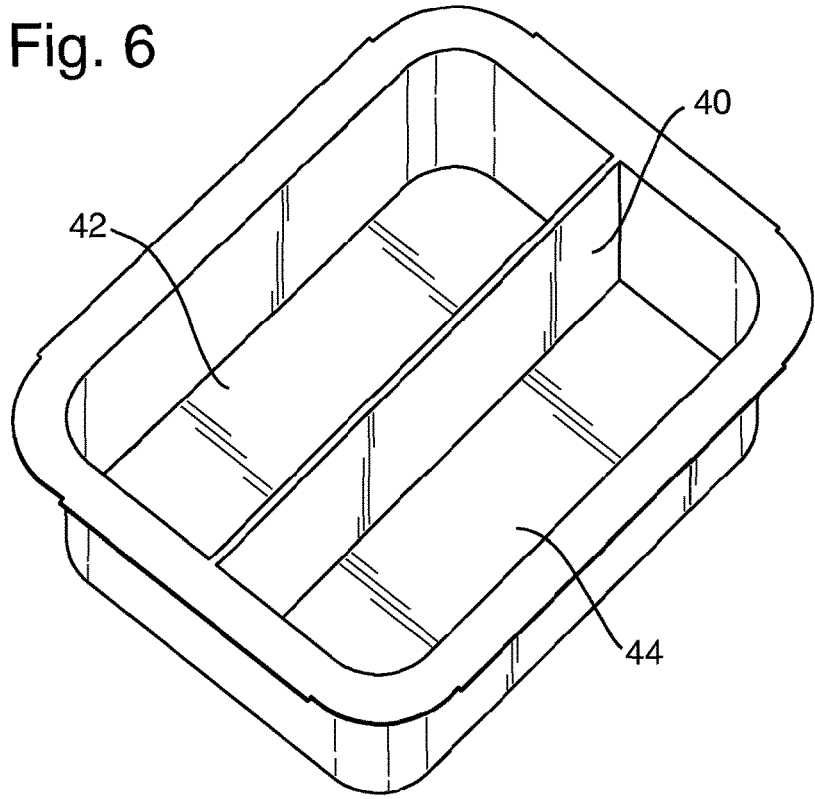
Figure 7:
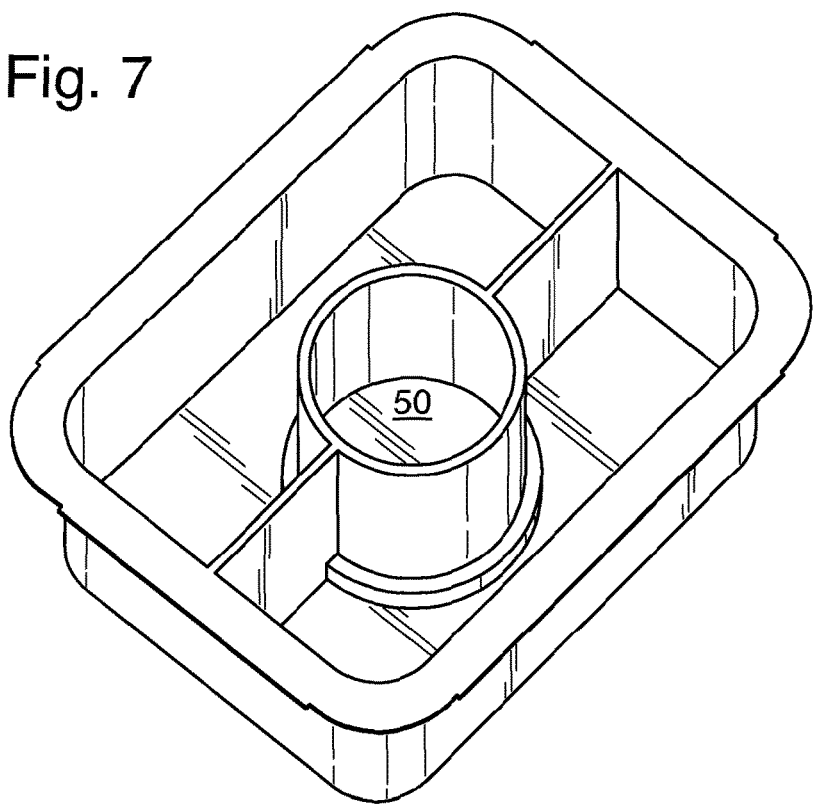

FIGS. 4 and 5 correspond to FIGS. 2 and 3, but from a different perspective;

FIG. 6 shows a second embodiment of container, for containing two dishwashing compositions; and FIG. 7 shows a third embodiment of container for containing three dishwashing compositions.

Figure 1:
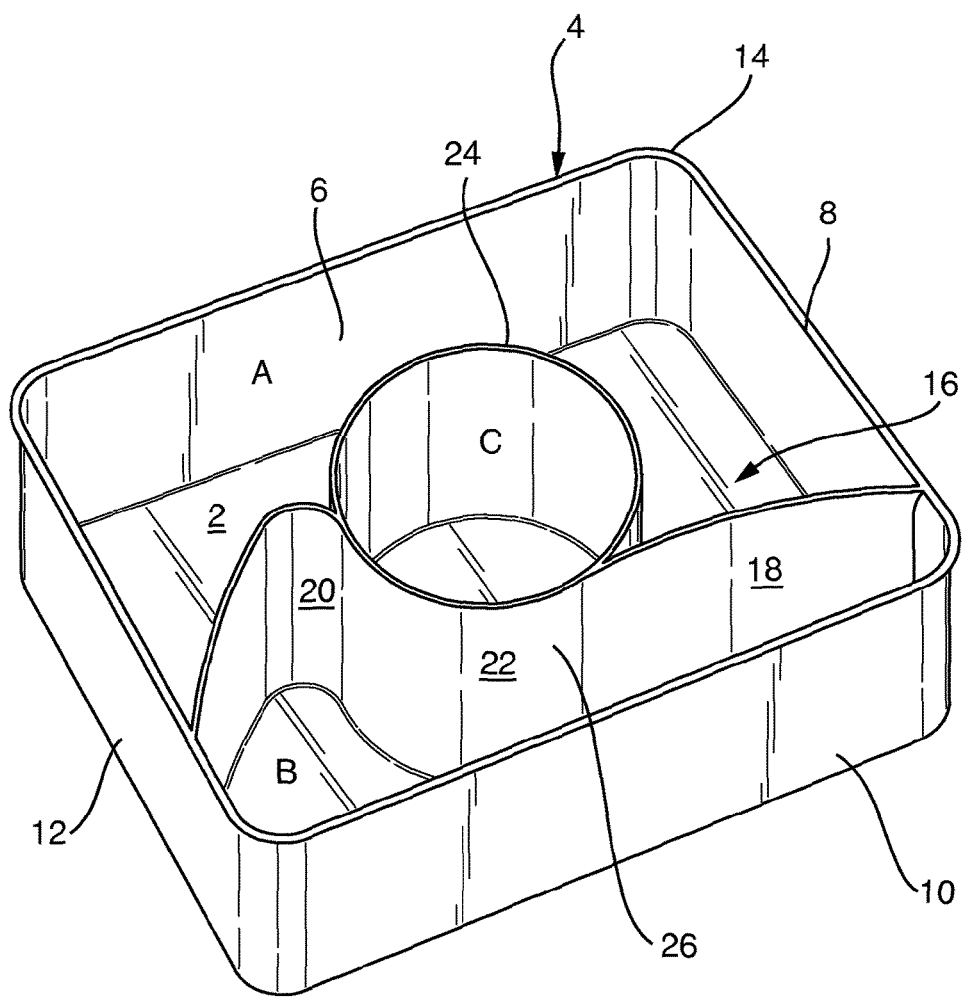
FIG. 1 shows a first embodiment of container for containing three dishwashing compositions.

The container shown in FIG. 1 has a base wall 2, an upright perimeter wall 4 having four perimeter wall parts 6, 8, 10 and 12. In plan view the wall parts give the shape of a rectangle, with slightly curved corners 14. Walls 6, 10 are slightly longer than walls 8, 12.

The container is formed of water-soluble polyvinyl alcohol polymer, and has an upright internal wall generally indicated as 16. The internal wall is the same height as the perimeter wall. It has a sinuous wall 18, 20, 22 which spans the container, between opposed perimeter wall parts 8 and 12. This sinuous wall is interrupted, in its central region, by a curved wall portion 24 which defines, with a central section 26 of the sinuous wall 18, a cylindrical turret-like part. By means of this composite internal wall structure (called internal wall herein for simplicity and consistency), the container is formed into three compartments A, B and C; the first and second compartments A and B being bounded in part by the perimeter wall, and the third or internal compartment C being bounded entirely within the internal wall; and spaced from the perimeter.

Containers are moulded within any array of further containers, before being separated into individual containers. Its compartments are filled with different dishwashing compositions, which may include compositions which are mutually incompatible, or, at least, which are desirably kept apart in order to avoid shelf-life reduction (e.g. enzymes and bleach components may desirably be separated.

The moulding process employs a female mould of generally cuboid shape, corresponding to the overall cuboid shape of the container, and first and second male mould parts 30, 32, shown in FIGS. 2 to 5. Male mould part 30 corresponds to or defines the shape of compartment A in FIG. 1. Male mould part 32 corresponds to or defines the shape of compartment B in FIG. 1. The male mould parts 30, 32 are nested together with a small gap between them, in which the internal wall is moulded. Also, the male mould parts 30, 32 leave a central opening which defines the shape of the third or internal compartment C. The wall of compartment C is formed in the contiguous gaps between the first male mould part 30 and a third male mould part in the form of a cylindrical core (not shown); and between the second male mould part 32 and the cylindrical core. During moulding the cylindrical core substantially fills that opening 34, leaving a small gap around it, into which molten polymer flows, to form the internal wall 22, 24, which defines compartment C.

Thus, the gaps between each of the male mould parts 30, 32 and the core (not shown) defines the shape and thickness of the central, turret-like part of the internal wall. The gaps 36, 38 between the male mould parts 30, 32 themselves define the shape and thickness of the end regions 18, 20 of the internal wall on opposed sides of the central region. The gaps between each male mould part and the female part define the perimeter wall and the base wall.

In this embodiment the mean thickness of all of the walls (the base wall, perimeter wall, and internal wall) is 0.4 mm. Mean thickness is measured by taking five thickness gauge readings at random positions in perimeter wall part 6; five thickness gauge readings at random positions in wall part 8; five thickness gauge readings at random positions in wall part 10; five thickness gauge readings at random positions in wall part 12; five thickness gauge readings at random positions in base wall part 2; five thickness gauge readings at random positions in internal wall region 18; five thickness gauge readings at random positions in internal wall region 22; and five thickness gauge readings at random positions in internal wall region 20; and averaging all of these.

The weight of the container as moulded (no lidding film; no contents) is less than 2.2 g.

In contrast, in the prior method which used a single male mould part, the mean thickness was 0.7 mm, and the weight was up to 3 g.

FIG. 6 shows a simpler container, also formed of water-soluble polyvinyl alcohol, and having a simple planar dividing wall 40 separating the container into two identical compartments 42, 44. There is no internal compartment. However the principles of making the container of FIG. 6 are the same as those employed for the more complex container of FIGS. 1 to 5. It will be immediately clear that the respective opposed surfaces of the two male mould parts which define the dividing wall 40, are accessible, and can be highly polished. The third, core, mould part present in the first embodiment described above is not present in the embodiment of FIG. 6.

FIG. 7 shows a water-soluble polyvinyl alcohol container similar to that of FIG. 6, but having an internal compartment 50, of the type shown in FIG. 1. Thus, in this embodiment there is a third, core, mould part, of the type present in the first embodiment.

In the conventional process there is generally one male mould part. It enters the female part, injection of molten polymer takes place, and the male and female parts separate. In the present invention first and second mould parts, corresponding in shape to the shape of the first and second compartments, are inserted into the female mould part together, and injection of molten water-soluble polymer (such as polyvinyl alcohol) takes place, as before. For the separation, the first male mould part, shown as 32 in FIG. 3, is withdrawn. Only subsequently is the second mould part 30 is withdrawn. As can be understood from a consideration of the first, second and third embodiments, described with reference to FIGS. 1 to 7, there may or may not be a third, core, mould part, producing an internal compartment.

It is possible to produce the male mould parts with all of their polymer-contacting surfaces having an extremely smooth finish, including in all regions of the internal wall. There is no limitation to the smoothing techniques which can be used. All polymer-contacting surfaces are preferably finished to a high polish. All polymer-contacting surfaces are preferably finished to the specific levels required for each. This may be to the same standard for each. In contrast, in the prior art method using a single mould, it was not possible to treat the surfaces corresponding to those shown as 36 and 38 in FIG. 2 in an adequate way, especially in the demoulding direction, to obtain surface finishes of such high quality as the other polymer-contacting surfaces.

As a consequence of the methods of the invention demoulding is improved, and the moulding cycle can be reduced, compared with the earlier method describe above. It will be observed that, using first and second male mould parts as described, support can be provided for the container along every wall which is present. The walls of the container can be made extremely thin without risking failure, and savings in the amount of polymer used can be realised.

The invention claimed is:

1. A method of making a plurality of unit-dose warewashing products each comprising an upwardly open container having a base wall, an upright perimeter wall, and an upright internal wall between one part of the perimeter wall and another part of the perimeter wall, the internal wall and the perimeter wall forming first and second compartments within the container, wherein the method comprises:
   injecting a molten water-soluble polymer comprising polyvinyl alcohol, polyvinyl alcohol copolymer, or partially hydrolyzed polyvinyl acetate into a mould cavity between cooperating male and female mould parts;
   wherein there is an independently movable first male mould part and an independently movable second male mould part separated by a gap in which the internal wall is formed;
   wherein the first and second male mould parts are independently movable with respect to one another and correspond to the first and second compartments of the container to be formed;
   wherein the surfaces of the first and second male mould parts that define the gap in which the internal wall is formed are fully accessible by virtue of the first male mould part being fully withdrawn before the second male mould part is withdrawn from the female mould part, and
   introducing different compositions effective in cleaning into respective compartments; and
   closing the container;
   wherein the method comprises, before the injection moulding of at least one of the containers, smoothing all the polymer-contacting surfaces of the first and second male mould parts.

2. The method as claimed in claim 1, wherein the internal wall has an intermediate region which defines a third compartment entirely spaced from the perimeter of the container.

3. The method as claimed in claim 2, wherein the method employs a third male mould part which is located between the first and second male mould parts and defines, with them, the third compartment.

4. The method as claimed in claim 1, wherein the container has only two compartments which are formed in part by the perimeter wall; and
   wherein the container has no internal compartment.

5. The method as claimed in claim 1, wherein the internal wall is substantially aligned with an upright wall of a male part.

6. The method as claimed in claim 1, wherein the perimeter wall is substantially aligned with an upright wall of a male part.

7. The method as claimed in claim 1, wherein the mean thicknesses of the base wall, perimeter wall and internal wall are each not greater than 0.6 mm.

8. The method as claimed in claim 7, wherein the fill volume of the container is in the range of 12-24 $cm^3$.

9. The method as claimed in claim 1, wherein the weight of the container is not greater than 2.5 g.

10. The method as claimed in claim 1, wherein the water-soluble polymer is poly(vinyl alcohol).

11. The method as claimed in claim 1, wherein said smoothing is by polishing.

12. The method as claimed in claim 1, wherein said smoothing is in a direction substantially parallel to the demoulding direction, to create microscopic striations following the demoulding direction.

* * * * *